United States Patent [19]

Boyd

[11] 4,203,153
[45] May 13, 1980

[54] CIRCUIT FOR REDUCING POWER CONSUMPTION IN BATTERY OPERATED MICROPROCESSOR BASED SYSTEMS

[75] Inventor: James C. Boyd, Canton, Ohio
[73] Assignee: Diebold, Incorporated, Canton, Ohio
[21] Appl. No.: 895,771
[22] Filed: Apr. 12, 1978
[51] Int. Cl.² .................................................. G06F 3/00
[52] U.S. Cl. ....................................................... 364/200
[58] Field of Search ... 364/200 MS File, 900 MS File; 365/226, 227, 228, 229

[56] References Cited

U.S. PATENT DOCUMENTS

| | | | |
|---|---|---|---|
| 3,363,234 | 1/1968 | Erickson | 364/200 |
| 3,535,560 | 10/1970 | Cliff | 364/200 |
| 3,641,328 | 2/1972 | Osborne | 364/707 |
| 3,736,569 | 5/1973 | Bouricius et al. | |
| 3,771,132 | 11/1973 | Biewer | 364/900 |
| 3,771,144 | 11/1973 | Belady | 364/200 |
| 3,922,526 | 11/1975 | Cochran | 235/152 |
| 3,941,989 | 3/1976 | McLaughlin et al. | 364/900 |
| 3,955,185 | 5/1976 | Nishimura | 340/324 R |
| 3,969,703 | 7/1976 | Kwiatkowski et al. | 364/900 |
| 4,051,326 | 9/1977 | Badagnani et al. | 364/900 |
| 4,093,997 | 6/1978 | Germer | 364/900 |

Primary Examiner—Gareth D. Shaw
Assistant Examiner—E. Chan
Attorney, Agent, or Firm—Frease & Bishop

[57] ABSTRACT

In a microprocessor based system, wherein at least one microprocessor is battery powered, a power strobe circuit includes an analog switch for connecting the battery to the microprocessor only during programmed task performance. Upon completion of task performance, the microprocessor generates signals which trigger the analog switch to open, thereby deenergizing the microprocessor and to enable an external timer. After a predetermined period of time, which may be fixed in the timer or programmed, the timer causes the switch to reclose, thereby energizing the microprocessor for performance of another programmed task.

8 Claims, 3 Drawing Figures

CIRCUIT FOR REDUCING POWER CONSUMPTION IN BATTERY OPERATED MICROPROCESSOR BASED SYSTEMS

BACKGROUND OF THE INVENTION

1. Field of the Invention

The present invention relates generally to power conservation in a battery operated, microprocessor based system, and more particularly, toward a battery conserving circuit, wherein battery power to a microprocessor is strobed to save power and wherein the off-time of the stroke is controlled by a timer external to the microprocessor.

2. Description of the Prior Art

Non-microprocessor controlled systems have been used for monitoring parameters at a plurality of remote points, and a remote monitoring station containing external condition responsive sensors is located at each point. The sensors are designed to detect various parameters of interest. For example, in a security system, the sensors may be responsive to open or close doors, windows or the like; and in other control systems, to the condition, for example, of a group of thermostats. It appears desirable that each remote station should contain a microprocessor that monitors the sensors, stores electrical signals developed by the sensors, and transmits the signal to a central console during polling; but such use of microprocessors has not been economically feasible.

The term "microprocessor" ($\mu$p) as referred to herein is considered to be a central processing unit having an internal clock, preferably fabricated on a single chip, and powered from a single power supply terminal. The $\mu$p typically includes an arithmetic and logic unit (ALU), an input/output state and control stages.

When a remote station uses a microprocessor it may be operated by commercial line power through an appropriate power supply converter and there is no economic problem. In some applications, such as security monitoring, it is mandatory that each remote station remain operative at all times. In the event of a power line failure, for example, a back-up battery is generally provided that automatically is switched into the power supply circuit in place of the power supply converter. Upon return of line power, the battery is automatically switched out of circuit and simultaneously replaced by the power supply converter.

The back-up battery systems in the prior art of which I am aware have been generally satisfactory for short term power failures. Since a microprocessor draws a substantial amount of current, however, the back-up battery becomes fully discharged in a relatively short period of time, and its use is not economically feasible for long periods of time. It has been estimated, for example, that a typical back-up battery has a capacity of about 8 hours of continuous operation under load by a standard microprocessor. In security monitoring systems, however, 8 hours of back-up operation is unsatisfactory; back-up operation of at least 80 hours may be necessary during a line power failure in a vacated facility over a three day weekend, for example, wherein the failure may be unnoticed or unrepairable.

Accordingly, one object of the present invention is to provide a circuit for conserving battery consumption in a battery operated, microprocessor based system.

Another object is to provide a circuit for strobing battery power to a microprocessor at predetermined times in order to minimize battery consumption.

Another object is to provide a circuit that strobes battery power to a microprocessor under program control, wherein the microprocessor is connected to the battery only during task performance and is disconnected from the battery at all other times.

In prior art of which I am aware, memory stages have been strobed by a battery only during periods of time that the memories are being written into or read out. In other prior art, data processing circuitry is continuously energized while a display module is periodically deenergized to conserve battery power. In still other prior art, various sections of data processing system are successively energized by a battery while remaining sections are deenergized, with all sections eventually being energized for various time durations. None of the prior art systems of which I am aware, however, provides any means for strobing battery power to a microprocessor and doing so by transferring power-return control to an external timer and switch during the power-off time periods. In other words, all prior systems of which I am aware, keep the "intelligent controller" (microprocessor) active all of the time; whereas an object of the invention involves turning off the intelligent controller and allowing a very simple (and low current) unintelligent circuit to turn it back on.

Another object of the invention, therefore, is to provide a battery saving circuit in a microprocessor based system, wherein the microprocessor is deenergized upon completion of a programmed task and re-energized under control of an external control means for performance of another programmed task.

Another object is to provide a battery saving circuit in a microprocessor based system, wherein the power connection between a battery and a microprocessor is interrupted under control of the microprocessor upon completion of a programmed task, an external timer is simultaneously triggered by the microprocessor to time out a predetermined or programmed time period, and wherein the external timer reestablishes the power connection after the predetermined time period to energize the microprocessor for performance of another programmed task.

SUMMARY OF THE INVENTION

A battery saving circuit in a battery operated, microprocessor based system includes a switch for selectively establishing a connection between the battery and microprocessor to energize or deenergize the microprocessor under program control. The switch is controlled by a timer that is external to the microprocessor and triggered by the microprocessor upon completion of each programmed task performance. The timer opens the switch to deenergize the microprocessor for a predetermined time duration. Thereafter, the timer recloses the switch to supply battery power to the microprocessor for performance of another programmed task.

The duration of time during which the microprocessor is deenergized may be fixed in the timer. Alternatively, the timer may be programmable with the time duration of the timer being set by the microprocessor upon completion of each task.

Of particular importance, the entire microprocessor is deenergized following triggering of the external timer by the microprocessor and reenergization is under the exclusive control of the timer. The saving of battery power that is possible with the present system can be appreciated upon recognizing that in microprocessor systems involving polling, each microprocessor may be operative for only 10% of the time, for example, with data acquired during that time being transferred to an external memory for storage. Since the microprocessor provides a very significnt current drain on the battery, the average power consumption of the microprocessor can be reduced by one order of magnitude.

In this regard, in accordance with one aspect of the present invention, a microprocessor based system comprises a central console and a plurality of remote units, each containing a microprocessor in communication with the central console. Each microprocessor is connected to a set of external condition sensors and is operative to periodically sample the condition of the sensors and store the results in a memory, the microprocessor being programmed to periodically sample the state of the sensors under control of a program memory at the remote station. The microprocessor is periodically polled by the central console to call for the stored sensor signals.

The remote microprocessors may be battery operated full time. Preferably, however, the microprocessors are powered by the AC power line using a power supply converter with a back-up battery as an emergency power source upon failure of the AC power line. The battery saving circuit, or power strobe, of the present invention thus serves to extend battery back-up operation time of the remote stations. It is to be understood, however, that the battery saving circuit can be used in any other type of battery operated, microprocessor based system wherein battery operation is required over an extended period of time.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Similar numerals refer to similar parts throughout the drawings.

DETAILED DESCRIPTION OF A PREFERRED EMBODIMENT

Figure 1:
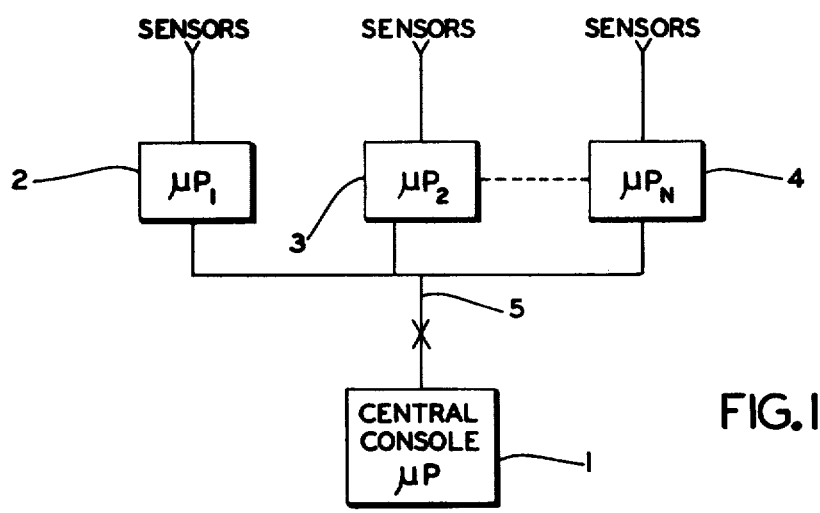
FIG. 1 is a simplified block diagram showing a microprocessor based system including a plurality of remote microprocessors that are polled by and in communication with a central console.

Referring to FIG. 1, a central console 1 containing at least one microprocessor ($\mu p$) is in communication with a plurality of remote stations, such as 2, 3 and 4 containing, respectively, microprocessors $\mu p_1$, $\mu p_2$, and $\mu p_N$. The remote stations 2, 3 and 4 are connected to the central console 1 over a bidirectional data bus 5. Data senders and receivers for interfacing the microprocessors to bus 5 are conventional and therefore not described herein. Each microprocessor $\mu p_1$, $\mu p_2$ and $\mu p_N$ has connected thereto a set of external condition responsive sensors that respond to predetermined conditions, such as opening or closing of windows and doors in a security monitoring system, for example, or the condition of a set of thermostats in heating systems.

Each of the microprocessors $\mu p_1$, $\mu p_2$, $\mu p_N$ is programmed to periodically monitor the condition of the input sensors, store signals representing conditions in a memory storage circuit and periodically transfer the stored signals over bus 5 to the central console 1 upon command by the central console in a mode of operation known as polling.

Although a relatively large number of microprocessors may be required in a microprocessor based system of the type shown in FIG. 1, requiring a large number of remote stations, each microprocessor is only used for a relatively short duration of time, e.g., 10% duty cycle. The microprocessors in the remote stations 2, 3 and 4 are generally powered by the commercial AC power line using a power supply converter, whereby a virtually unlimited source of power is available. But microprocessors are not necessarily continuously energized, and need be energized only during limited usage of each microprocessor.

In applications wherein the remote microprocessors are battery powered full time or on a back-up emergency basis, however, the microprocessor presents a significant battery current drain. In accordance with the present invention, battery power consumption is reduced by strobing battery power to the microprocessor under control of the microprocessor itself, the microprocessor being operated to control battery disconnection upon completion of a programmed task, such as a sensor monitoring cycle. Upon disconnection, the microprocessor transfers control to an external timer controlled switch which is preset or programmed to reconnect the microprocessor after a predetermined time duration.

Figure 2:
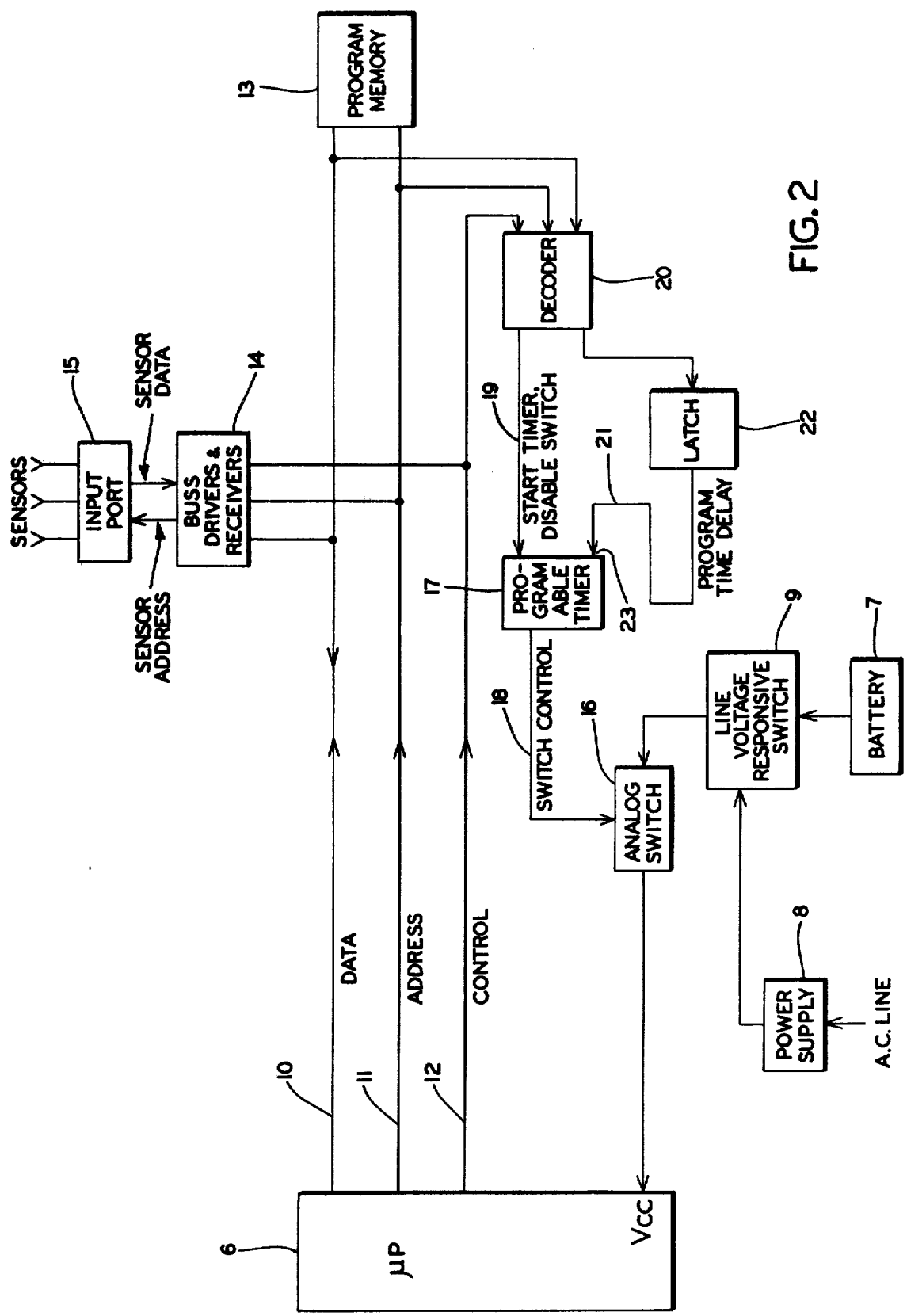
FIG. 2 is a block diagram of the battery saving, or strobe, circuit in accordance with the invention.

Referring to FIG. 2, a microprocessor 6 has a power supply terminal $V_{cc}$ for receiving power through analog switch 16 from an external power source, such as battery 7, or from a power supply converter 8 connected to the commercial AC power line. A line voltage responsive switch 9 is connected to the analog switch 16 and selectively supplies power from power supply 8 or battery 7 to the microprocessor 6. During normal line power operation, the line voltage responsive switch 9 is operative to supply power only from power supply 8 to analog switch 16. In response to power line failure, the switch 9 disconnects power supply 8 and connects battery 7 to analog switch 16. Line voltage responsive switch 9 is well known in the prior art and therefore is not described in detail herein.

Microprocessor 6, which may be a Signetics 2650 microprocessor, for example, which generates and receives data on bidirectional data lines 10, generates addressing signals on address lines 11 and generates control signals on control lines 12, in a known manner. An external program memory 13 supplies program instructions to microprocessor 6 in response to address signals on lines 11 to control operation of a microprocessor 6 to perform predetermined tasks. In the preferred embodiment, data lines 10, address lines 11 and control lines 12 are connected to a conventional bus driver and reciver module 14, which, in turn, is connected to the output of input port module 15. The input of input port 15 is connected to the outputs of a set of sensors and supplies signals from the sensors to the module 14 in response to address signals generated by the microprocessor 6 over lines 11. The signals generated by the sensors are scanned by the input port 15 in a conventional manner and transmitted to microprocessor 6 over data lines 10.

Analog switch 16 connected between the microprocessor 6 and line voltage responsive switch 9 is a high current, voltage controlled, analog switch such as a 2N4403 transistor. When microprocessor 6 is in operation, analog switch 16 is selectively closed to supply power to the microprocessor or open to deenergize the microprocessor. Operation of analog switch 16 is controlled by the output of a programmable timer 17 that supplies a control signal to the analog switch 16 over control lines 18. The programmable timer 17, which may be a Motorola MC4541BCP module, maintains the analog switch 16 normally on, to cause the microprocessor 6 to be powered during monitoring of the external sensors at input port 15, or other task performance. Upon completion, the programmable timer 17 is triggered by a signal generated on line 19 to turn off (open) analog switch 16, maintain the switch open for a predetermined time and then reclose the switch. During the off time of the analog switch 16, microprocessor 6 is completely deenergized and there is no power drain by the microprocessor load since it is isolated from the power source.

Where there may be a power failure at power supply 8, the line voltge responsive switch 9 automatically connects battery 7 as a power supply to the analog switch 16.

A decoder 20 is connected to the microprocessor lines 10, 11 and 12, and is responsive to a predetermined set of signals on those lines to generate a trigger pulse on line 19 to timer 17. Decoder 20, which may be a Fairchild 4724PC, is thus responsive to and controlled by the microprocessor 6 itself to call for removal of power.

The off time of analog switch 16 may be fixed by timer 17, the on time being controlled by the microprocessor 6 depending upon the length of the task being performed. Alternatively, the off time of analog switch 16 may be programmed by the output of microprocessor 6 upon completion of each task by providing signals on lines 10, 11 and 12 appropriate to generate a time delay control signal to the timer 17 on line 21. The time delay control signal generated by decoder 20 is stored in a latch 22, the output of latch 22 being connected to the time delay duration input 23 of programmable timer 17.

Of particular significance, programmable timer 17 is external to microprocessor 6. Upon completion of a programmed task performance, microprocessor 6 controls removal of power from its power supply terminal $V_{cc}$; thereafter, the microprocessor transfers power supply control to the external programmable timer 17 which subsequently reconnects the power source to the microprocessor 6. The microprocessor 6 is completely disabled during the time delay period. Since performance of some typical tasks may, in practice, be completed within a few milliseconds, and only repeated several times per second, for example, it can be appreciated that power consumption by the microprocessor 6 is drastically reduced using the present invention. It is also emphasized that the entire microprocessor 6 is disabled in contrast with merely portions or sections of a processor stage or memory stage being disabled, as in the prior art.

Figure 3:
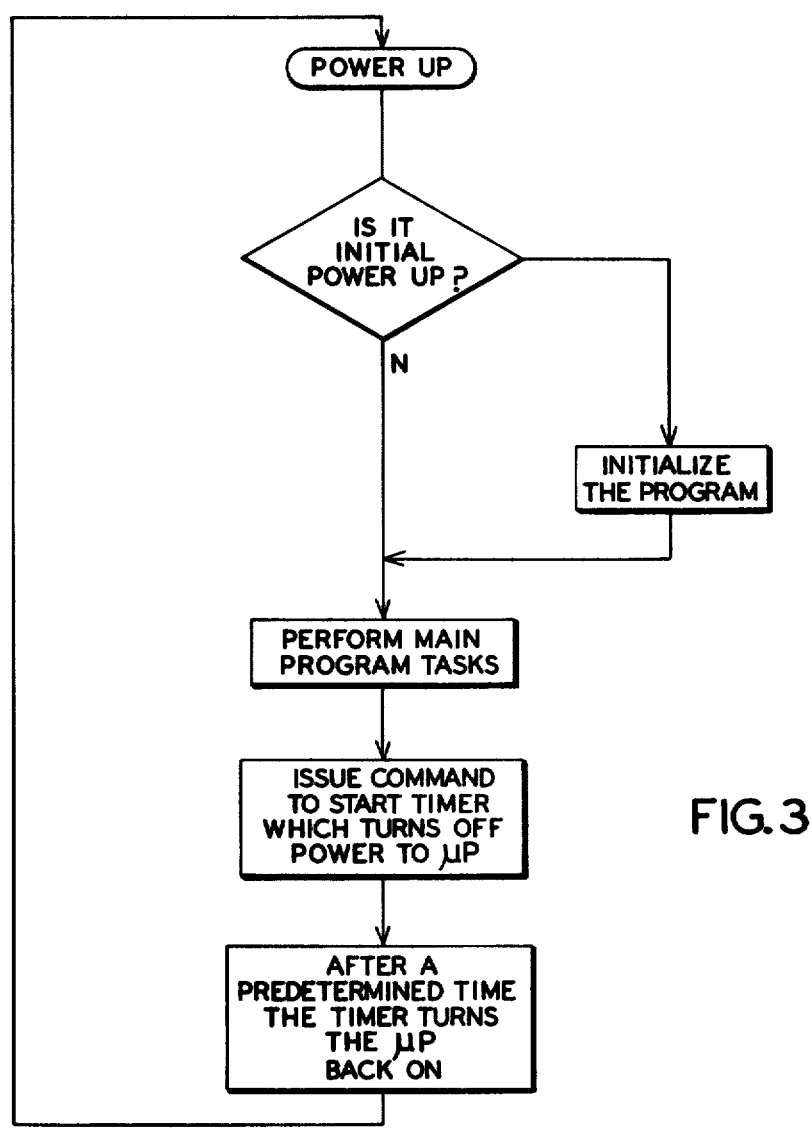
FIG. 3 is a flow chart explaining the operation of the battery saver circuit under control of a microprocessor.

Referring to FIG. 3, the operation of the battery saving, or strobing, circuit is summarized in connection with a typical operating sequence. The microprocessor is turned on initially in a power up step. If power up is the initial power up, that is, one preceding the first performance of a task, the program storage registers within microprocessor 6 are initialized and instructions from program memory 13 are transferred to the microprocessor for storage. The main program tasks are now performed by the microprocessor, which might include monitoring of sensor outputs at input port 15. Assuming that the microprocessor 6 is being operated in the battery mode, line voltage resposive switch 9 is closed between battery 7 and analog switch 16, and is opened between power supply 8 and analog switch 16. Analog switch 16 is maintained normally closed by the output of programmable timer 17 thereby supplying battery power to the microprocessor 6.

Upon completion of a programmed task, the outputs 10, 11 and 12 of the microprocessor 6 are decoded in decoder 20 to issue a command to trigger programmable timer 17 by a trigger pulse on line 19. In response to the trigger pulse, timer 17 generates a turn off signal to analog switch 16 which opens, disconnecting battery 7 from the microprocessor 6. After a predetermined time duration, which is either fixed or programmable by the output of decoder 20, as discussed above, the programmable timer 17 generates a signal to reclose switch 16 and reconnect battery 7 to the microprocessor 6. The microprocessor 6 now performs another programmed task under battery power. Again, upon completion of the task performance, the analog switch 16 is controlled by programmable timer 17 to disconnect the battery 7 from the microprocessor for the predetermined period of time, and so on. The second predetermined period of time may be different from the first predetermined period of time under program control, as discussed, or may be identical.

In this disclosure, there is shown and described only the preferred embodiments of the invention, but, as aforementioned, it is to be understood that the invention is capable of use in various other combinations and is capable of changes or modifications within the scope of the inventive concept as expressed herein. For example, although the invention has been described in connection with a multiple microprocessor system, it is clear that the principles are also applicable to a single microprocessor system. Further, in referring to a battery operated, microprocessor based system herein, the statement includes a line operated system with battery emergency back-up.

What I claim is:

1. A circuit for conserving battery power in a battery operated, microprocessor based system, comprising:
    a microprocessor having an internal clock;
    a battery for energizing said microprocessor;
    switch means for selectively establishing a connection between said battery and said microprocessor to energize or deenergize said microprocessor;
    means for providing instructions to said microprocessor which periodically call for task performances by said microprocessor to be executed upon energization of said microprocessor, said switch means being closed during task performances to maintain said microprocessor energized by said battery;

timer means continuously energized independently of said switch means as well as of said microprocessor and clock for controlling said switch means, said timer means operative, upon being triggered, to open said switch means and thereby disconnect said microprocessor from said battery for a predetermined time duration and then reclose said switch means after the predetermined time duration to reconnect said microprocessor with said battery and thereby enable said microprocessor for another task performance; and means responsive to an output of said microprocessor for triggering said timer means upon completion of each task performance.

2. The circuit of claim 1, wherein said triggering means includes decoder means for generating a digital signal in response to a predetermined signal generated by said microprocessor.

3. The circuit of claim 2, wherein said external timer means includes a programmable timer, and said decoder means includes means for programming said timer means for a time duration determined by said microprocessor.

4. The circuit of claim 3, wherein said switch means includes a voltage controlled, analog switch.

5. A method of reducing power consumption in a battery operated, microprocessor based system of a type wherein said microprocessor having an internal clock is operated to periodically perform programmed tasks upon energization of said microprocessor, comprising the steps of establishing an electrical connection between said battery and said microprocessor through a switch means; maintaining said switch means closed to energize said microprocessor during task performances; opening said switch means upon completion of each task performance to disconnect said microprocessor from said battery; and simultaneously with said opening step triggering by said microprocessor a timer means continuously energized independently of said switch means as well as of said microprocessor and clock to reclose said switch means after a predetermined time duration to reconnect said microprocessor with said battery and thereby enable said microprocessor for another task performance.

6. The method of claim 5, including the step of controlling the magnitude of said predetermined time duration in response to a signal generated by said microprocessor upon completion of the task performance.

7. A circuit for conserving power in a battery operated, microprocessor based system, comprising:

a central console;

a plurality of remote stations in communication with said central console, each of said stations including a microprocessor having an internal clock, external timer means energized independently of said microprocessor and clock, external condition sensing means controlled by said microprocessor, said microprocessor being programmed to periodically activate said sensing means for limited periods of time to perform tasks involving said sensing means; and means for storing signals generated by said sensing means; and means in said central console for polling said remote stations to call for said stored signals;

wherein each of said remote stations further includes a battery; switch means for selectively connecting said battery to energize or deenergize said microprocessor, said switch means being closed to energize said microprocessor during said task performances involving said sensing means, and means controlled by said microprocessor upon completion of each task performance to trigger said timer means, and to simultaneously open said switch means to disconnect said microprocessor from said battery for a time duration controlled by said timer means, said timer means being energized independently of said switch means and including means for reclosing said switch means after the time duration to reconnect said microprocessor with said battery and thereby enable said microprocessor for the next task performance.

8. The circuit of claim 7, wherein said external timer means includes a programmable timer, and said microprocessor includes means for programming the time duration of said timer means upon completion of each task performance.

* * * * *